(12) United States Patent
Jones et al.

(10) Patent No.: US 7,178,102 B1
(45) Date of Patent: Feb. 13, 2007

(54) REPRESENTING LATENT DATA IN AN EXTENSIBLE MARKUP LANGUAGE DOCUMENT

(75) Inventors: Brian Jones, Redmond, WA (US);
Marcin Sawicki, Kirkland, WA (US);
Robert Little, Redmond, WA (US);
Ziyi Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 333 days.

(21) Appl. No.: 10/730,854

(22) Filed: Dec. 9, 2003

(51) Int. Cl.
*G06F 15/00* (2006.01)
(52) U.S. Cl. .................................... 715/513
(58) Field of Classification Search ............... 715/513, 715/522, 542, 517, 502
See application file for complete search history.

(56) References Cited

U.S. PATENT DOCUMENTS

| 4,674,065 A | 6/1987 | Lange et al. ............... 382/311 |
| 4,868,750 A | 9/1989 | Kucera et al. ................. 711/2 |
| 5,020,019 A | 5/1991 | Ogawa .......................... 707/5 |
| 5,128,865 A | 7/1992 | Sadler ........................... 704/2 |
| 5,159,552 A | 10/1992 | van Gasteren et al. ......... 704/1 |
| 5,267,155 A | 11/1993 | Buchanan et al. .......... 715/540 |
| 5,317,546 A | 5/1994 | Balch et al. .................... 368/9 |
| 5,337,233 A | 8/1994 | Hofert et al. ............... 715/540 |
| 5,341,293 A | 8/1994 | Vertelney et al. ........... 715/530 |
| 5,351,190 A | 9/1994 | Kondo .......................... 704/8 |
| 5,392,386 A | 2/1995 | Chalas ....................... 715/841 |
| 5,446,891 A | 8/1995 | Kaplan et al. .............. 395/600 |
| 5,541,836 A | 7/1996 | Church et al. ................. 704/7 |
| 5,596,700 A | 1/1997 | Darnell et al. .............. 715/512 |
| 5,617,565 A | 4/1997 | Augenbraun et al. ....... 395/604 |
| 5,625,783 A | 4/1997 | Ezekiel et al. .............. 395/352 |
| 5,627,958 A | 5/1997 | Potts et al. ................. 715/708 |
| 5,634,019 A | 5/1997 | Koppolu et al. ............ 715/744 |
| 5,640,560 A | 6/1997 | Smith ......................... 395/615 |
| 5,657,259 A | 8/1997 | Davis et al. ................ 708/204 |

(Continued)

FOREIGN PATENT DOCUMENTS

EP  0481784 A2  4/1992

(Continued)

OTHER PUBLICATIONS

Oliver Meyer, Creating Validated XML Documents on the Fly Using MS Word, Oct. 20, 2002, pp. 113-121.*

(Continued)

*Primary Examiner*—Stephen Hong
*Assistant Examiner*—Wilson Tsui
(74) *Attorney, Agent, or Firm*—Merchant & Gould

(57) ABSTRACT

Methods and systems allow style and other formatting settings to remain latent until one or more particular style or formatting settings is instantiated by a user. Data representing each latent style or formatting object is persisted in a data structure apart from the user's document. Each potential style setting or formatting setting may be set as locked for use for a given document or locked for non-use for a given document. Upon saving the document, no data is saved for the numerous available style and formatting settings in the document. When a particular style is called upon by a subsequent consuming application, that application may then instantiate the particular style or formatting setting based on the properties of that style or formatting setting available from the subsequent consuming application.

16 Claims, 6 Drawing Sheets

U.S. PATENT DOCUMENTS

| | | | |
|---|---|---|---|
| 5,708,825 A | 1/1998 | Sotomayor | 395/762 |
| 5,717,923 A | 2/1998 | Dedrick | 395/613 |
| 5,752,022 A | 5/1998 | Chiu et al. | 395/610 |
| 5,761,689 A | 6/1998 | Rayson et al. | 707/533 |
| 5,781,189 A | 7/1998 | Holleran et al. | 715/826 |
| 5,781,904 A | 7/1998 | Oren et al. | 707/100 |
| 5,794,257 A | 8/1998 | Liu et al. | 707/501 |
| 5,802,253 A | 9/1998 | Gross et al. | 395/51 |
| 5,802,262 A | 9/1998 | Van De Vanter | 395/180 |
| 5,802,299 A | 9/1998 | Logan et al. | 395/200.48 |
| 5,802,530 A | 9/1998 | van Hoff | 707/513 |
| 5,805,911 A | 9/1998 | Miller | 395/796 |
| 5,809,318 A | 9/1998 | Rivette et al. | 715/512 |
| 5,815,830 A | 9/1998 | Anthony | 707/6 |
| 5,818,447 A | 10/1998 | Wolf et al. | 715/752 |
| 5,821,931 A | 10/1998 | Berquist et al. | 715/784 |
| 5,822,539 A | 10/1998 | van Hoff | 395/200.66 |
| 5,826,025 A | 10/1998 | Gramlich | 395/200.47 |
| 5,845,077 A | 12/1998 | Fawcett | 709/221 |
| 5,855,007 A | 12/1998 | Jovicic et al. | 705/14 |
| 5,859,636 A | 1/1999 | Pandit | 715/501.1 |
| 5,872,973 A | 2/1999 | Mitchell et al. | 395/685 |
| 5,875,443 A | 2/1999 | Nielsen | 707/2 |
| 5,892,919 A | 4/1999 | Nielsen | 395/200.58 |
| 5,893,073 A | 4/1999 | Kasso et al. | 705/8 |
| 5,895,461 A | 4/1999 | De La Huerga et al. | 707/1 |
| 5,896,321 A | 4/1999 | Miller et al. | 365/189.01 |
| 5,900,004 A | 5/1999 | Gipson | 707/530 |
| 5,913,214 A | 6/1999 | Madnick et al. | 707/10 |
| 5,920,859 A | 7/1999 | Li | 707/5 |
| 5,924,099 A | 7/1999 | Guzak et al. | 707/100 |
| 5,933,498 A | 8/1999 | Schneck et al. | 705/54 |
| 5,946,647 A | 8/1999 | Miller et al. | 704/9 |
| 5,948,061 A | 9/1999 | Merriman et al. | 709/219 |
| 5,956,681 A | 9/1999 | Yamakita | 704/260 |
| 5,974,413 A | 10/1999 | Beauregard et al. | 707/6 |
| 5,995,756 A | 11/1999 | Hermann | 395/712 |
| 6,006,265 A | 12/1999 | Rangan et al. | 709/226 |
| 6,006,279 A | 12/1999 | Hayes | 719/328 |
| 6,014,616 A | 1/2000 | Kim | 704/8 |
| 6,028,605 A | 2/2000 | Conrad et al. | 345/840 |
| 6,052,531 A | 4/2000 | Waldin et al. | 717/170 |
| 6,061,516 A | 5/2000 | Yoshikawa et al. | 717/109 |
| 6,067,087 A | 5/2000 | Krauss et al. | 715/762 |
| 6,085,201 A | 7/2000 | Tso | 715/505 |
| 6,092,074 A | 7/2000 | Rodkin et al. | 707/102 |
| 6,108,674 A | 8/2000 | Murakami et al. | 715/515 |
| 6,112,209 A | 8/2000 | Gusack | 707/101 |
| 6,121,968 A | 9/2000 | Arcuri et al. | 345/352 |
| 6,122,647 A | 9/2000 | Horowitz et al. | 707/513 |
| 6,126,306 A | 10/2000 | Ando | 708/605 |
| 6,137,911 A | 10/2000 | Zhilyaev | 382/225 |
| 6,141,005 A | 10/2000 | Hetherington et al. | 715/866 |
| 6,151,643 A | 11/2000 | Cheng et al. | 710/36 |
| 6,154,738 A | 11/2000 | Call | 707/4 |
| 6,167,568 A | 12/2000 | Gandel et al. | 717/176 |
| 6,173,316 B1 | 1/2001 | De Boor et al. | 709/218 |
| 6,182,029 B1 | 1/2001 | Friedman | 704/9 |
| 6,185,550 B1 | 2/2001 | Snow et al. | 707/1 |
| 6,185,576 B1 | 2/2001 | McIntosh | 707/200 |
| 6,199,046 B1 | 3/2001 | Heinzle et al. | 705/1 |
| 6,199,081 B1 | 3/2001 | Meyerzon et al. | 715/513 |
| 6,219,698 B1 | 4/2001 | Iannucci et al. | 709/221 |
| 6,262,728 B1 | 7/2001 | Alexander | 345/440.1 |
| 6,272,074 B1 | 8/2001 | Winner | 368/10 |
| 6,272,505 B1 | 8/2001 | De La Huerga | 707/501 |
| 6,292,768 B1 | 9/2001 | Chan | 704/1 |
| 6,295,061 B1 | 9/2001 | Park et al. | 715/764 |
| 6,308,171 B1 | 10/2001 | De La Huerga | 707/3 |
| 6,311,177 B1 | 10/2001 | Dauerer et al. | 707/2 |
| 6,311,194 B1 | 10/2001 | Sheth et al. | 715/505 |
| 6,323,853 B1 | 11/2001 | Hedloy | 345/339 |
| 6,336,125 B2 | 1/2002 | Noda et al. | 715/531 |
| 6,336,131 B1 | 1/2002 | Wolfe et al. | 709/203 |
| 6,338,059 B1 | 1/2002 | Fields et al. | 707/4 |
| 6,347,398 B1 | 2/2002 | Parthasarathy et al. | 717/170 |
| 6,349,295 B1 | 2/2002 | Tedesco et al. | 707/3 |
| 6,353,926 B1 | 3/2002 | Parthesarathy et al. | 717/11 |
| 6,424,979 B1 | 7/2002 | Livingston et al. | 715/511 |
| 6,434,567 B1 | 8/2002 | De La Huerga | 707/102 |
| 6,438,545 B1 | 8/2002 | Beauregard et al. | 707/6 |
| 6,477,510 B1 | 11/2002 | Johnson | 705/30 |
| 6,480,860 B1 | 11/2002 | Monday | 707/102 |
| 6,493,006 B1 | 12/2002 | Gourdol et al. | 345/825 |
| 6,516,321 B1 | 2/2003 | De La Huerga | 707/102 |
| 6,519,603 B1 | 2/2003 | Bays et al. | 707/102 |
| 6,546,433 B1 | 4/2003 | Matheson | 709/318 |
| 6,556,984 B1 | 4/2003 | Zien | 707/2 |
| 6,571,241 B1 | 5/2003 | Nosohara | 707/6 |
| 6,618,733 B1 | 9/2003 | White et al. | 707/103 |
| 6,623,527 B1 | 9/2003 | Hamzy | 715/513 |
| 6,625,581 B1 | 9/2003 | Perkowski | 705/27 |
| 6,629,079 B1 | 9/2003 | Spiegel et al. | 705/26 |
| 6,631,519 B1 | 10/2003 | Nicholson et al. | 717/169 |
| 6,636,880 B1 | 10/2003 | Bera | 708/206 |
| 6,658,623 B1 | 12/2003 | Schilit et al. | 715/513 |
| 6,687,485 B2 | 2/2004 | Hopkins et al. | 434/350 |
| 6,697,824 B1 | 2/2004 | Bowman-Amuah | 709/229 |
| 6,697,999 B1 * | 2/2004 | Breuer et al. | 715/517 |
| 6,708,189 B1 | 3/2004 | Fitzsimons et al. | 707/205 |
| 6,715,144 B2 | 3/2004 | Daynes et al. | 717/174 |
| 6,717,593 B1 | 4/2004 | Jennings | 715/760 |
| 6,718,516 B1 | 4/2004 | Claussen et al. | 715/513 |
| 6,728,679 B1 | 4/2004 | Strubbe et al. | 704/270.1 |
| 6,732,090 B2 | 5/2004 | Shanahan et al. | 707/3 |
| 6,732,361 B1 | 5/2004 | Andreoli et al. | 719/313 |
| 6,745,208 B2 | 6/2004 | Berg et al. | 707/201 |
| 6,792,577 B1 * | 9/2004 | Kimoto | 715/522 |
| 6,795,808 B1 | 9/2004 | Strubbe et al. | 704/275 |
| 6,826,726 B2 | 11/2004 | Hsing et al. | 715/513 |
| 6,868,525 B1 | 3/2005 | Szabo | 715/738 |
| 6,874,143 B1 | 3/2005 | Murray et al. | 717/173 |
| 6,880,129 B1 | 4/2005 | Lee et al. | 715/763 |
| 6,882,344 B1 * | 4/2005 | Hayes et al. | 345/467 |
| 6,883,137 B1 | 4/2005 | Girardot et al. | 715/513 |
| 6,925,457 B2 | 8/2005 | Britton et al. | 707/1 |
| 6,925,470 B1 | 8/2005 | Sangudi et al. | 707/102 |
| 6,948,133 B2 | 9/2005 | Haley | 715/780 |
| 6,954,895 B1 * | 10/2005 | Oak | 715/502 |
| 2001/0029605 A1 | 10/2001 | Forbes et al. | 717/11 |
| 2001/0041328 A1 | 11/2001 | Fisher | 434/157 |
| 2001/0056105 A1 | 12/2001 | Kampe et al. | 709/201 |
| 2002/0004803 A1 | 1/2002 | Serebrenikov | 715/513 |
| 2002/0007309 A1 | 1/2002 | Reynar | 705/14 |
| 2002/0026450 A1 | 2/2002 | Kuramochi | 707/104.1 |
| 2002/0029304 A1 | 3/2002 | Reynar et al. | 709/332 |
| 2002/0035581 A1 | 3/2002 | Reynar et al. | 715/513 |
| 2002/0065110 A1 | 5/2002 | Enns et al. | 455/566 |
| 2002/0065891 A1 | 5/2002 | Malik | 709/206 |
| 2002/0066073 A1 | 5/2002 | Lienhard et al. | 717/105 |
| 2002/0078222 A1 | 6/2002 | Compas et al. | 709/232 |
| 2002/0091803 A1 | 7/2002 | Imamura et al. | 709/220 |
| 2002/0100036 A1 | 7/2002 | Moshir et al. | 717/173 |
| 2002/0103829 A1 | 8/2002 | Manning et al. | 707/513 |
| 2002/0104080 A1 | 8/2002 | Woodard et al. | 717/176 |
| 2002/0120685 A1 | 8/2002 | Srivastava et al. | 709/203 |
| 2002/0129107 A1 | 9/2002 | Loughran et al. | 709/206 |
| 2002/0133523 A1 | 9/2002 | Ambler et al. | 707/536 |
| 2002/0149601 A1 | 10/2002 | Rajarajan et al. | 345/619 |
| 2002/0156792 A1 | 10/2002 | Gombocz et al. | 707/100 |
| 2002/0178008 A1 | 11/2002 | Reynar | 704/272 |
| 2002/0178182 A1 | 11/2002 | Wang et al. | 715/501.1 |
| 2002/0184247 A1 | 12/2002 | Jokela et al. | 707/204 |
| 2002/0188941 A1 | 12/2002 | Cicciarelli et al. | 717/175 |

| | | | |
|---|---|---|---|
| 2002/0194070 A1* | 12/2002 | Totham et al. | 705/14 |
| 2002/0196281 A1 | 12/2002 | Audleman et al. | 345/762 |
| 2002/0198909 A1 | 12/2002 | Huynh et al. | 707/513 |
| 2003/0002391 A1 | 1/2003 | Biggs | 368/82 |
| 2003/0005411 A1 | 1/2003 | Gerken | 717/120 |
| 2003/0009489 A1 | 1/2003 | Griffin | 707/500 |
| 2003/0025728 A1 | 2/2003 | Ebbo et al. | 345/744 |
| 2003/0051236 A1 | 3/2003 | Pace et al. | 717/177 |
| 2003/0056207 A1 | 3/2003 | Fischer et al. | 717/174 |
| 2003/0081791 A1 | 5/2003 | Erickson et al. | 380/282 |
| 2003/0084138 A1 | 5/2003 | Tavis et al. | 709/223 |
| 2003/0097318 A1 | 5/2003 | Yu et al. | 705/35 |
| 2003/0101204 A1 | 5/2003 | Watson | 708/206 |
| 2003/0101416 A1 | 5/2003 | McInnes et al. | 715/513 |
| 2003/0106040 A1 | 6/2003 | Rubin et al. | 717/106 |
| 2003/0121033 A1 | 6/2003 | Peev et al. | 717/175 |
| 2003/0126136 A1 | 7/2003 | Omoigui | 707/10 |
| 2003/0140308 A1 | 7/2003 | Murthy et al. | 715/500 |
| 2003/0154144 A1 | 8/2003 | Pokorny et al. | 705/28 |
| 2003/0158841 A1 | 8/2003 | Britton et al. | 707/3 |
| 2003/0158851 A1 | 8/2003 | Britton et al. | 707/100 |
| 2003/0172343 A1 | 9/2003 | Leymaster et al. | 715/500 |
| 2003/0192040 A1 | 10/2003 | Vaughan | 717/173 |
| 2003/0212527 A1 | 11/2003 | Moore et al. | 702/179 |
| 2003/0220795 A1 | 11/2003 | Araysantiparb et al. | 704/275 |
| 2003/0229593 A1 | 12/2003 | Raley et al. | 705/55 |
| 2003/0233330 A1 | 12/2003 | Raley et al. | 705/55 |
| 2004/0003389 A1 | 1/2004 | Reynar et al. | 717/178 |
| 2004/0006741 A1 | 1/2004 | Radja et al. | 715/513 |
| 2004/0165007 A1 | 8/2004 | Shafron | 345/781 |
| 2004/0199861 A1 | 10/2004 | Lucovsky | 715/500 |
| 2004/0236717 A1 | 11/2004 | Demartini et al. | 707/1 |
| 2005/0050164 A1 | 3/2005 | Burd et al. | 709/217 |
| 2005/0055330 A1 | 3/2005 | Britton et al. | 707/1 |
| 2005/0120313 A1 | 6/2005 | Rudd et al. | 715/866 |
| 2005/0187926 A1 | 8/2005 | Britton et al. | 707/3 |

FOREIGN PATENT DOCUMENTS

| | | |
|---|---|---|
| EP | 0598511 A2 | 5/1994 |
| EP | 0810520 B1 | 12/1998 |
| EP | 1093058 A1 | 4/2001 |
| EP | 1280068 A2 | 1/2003 |
| EP | 1361523 A2 | 11/2003 |
| EP | 1376392 A2 | 1/2004 |
| WO | WO 95/07510 A1 | 3/1995 |
| WO | WO 99/17240 A1 | 4/1999 |
| WO | WO 01/18687 A1 | 3/2001 |
| WO | WO 01/37170 A2 | 5/2001 |
| WO | WO 01/186390 A2 | 11/2001 |
| WO | WO 02/099627 A1 | 1/2002 |
| WO | WO 02/15518 A2 | 2/2002 |

OTHER PUBLICATIONS

"Altova markup your mind!" http://web.archive.org/web/20021204211721/http://altova.com/products_ide.html, Dec. 2002, pp. 1-3.

Apple Data Detectors User's Manual, Apple Computer, Inc., 1997, pp. 1-15.

Arbortext, "Arbortext and Accessibility", http://web.archive.org/web/20021219133536/www.arbortext.com/html/accessiblity.html, Dec. 2002, pp. 1-5.

Arbortext, "Arbortext's Support for XSL-FO", http://web.archive.org/web/20021221021632/www.arbortext.com/html/xsl-fo.html. Dec. 2002, pp. 1-4.

Arbortext, "Schemas", http://web.archive.org/web/20021221023148/www.arbortex.com/html/schemas.html, Dec. 2002, pp. 1-3.

Arbortext, "XML Compliance, 100% Pure XML", http:web.archive.org/web/20021209185855/www.arbortext.com/html/xml_compliance, Dec. 2002, pp. 1-3.

Barrett, Rob, Paul P. Maglio and Daniel C. Kellem; *How to personalize the Web*; Conference proceedings on human factors in computing systems (1997) p. 75-82.

"Being 'Smart' with Smart Tags in Office XP", Create for Mississippi, Aug. 2001, http://www.create.cett.msstate.edu/create/howto/smart_tags.pdf, 7 pp.

Bischof, Hans-Peter, "Spell, Spellin, Spellout—Finding Spelling Errors", http://www.vorlesungen.uni-osnabrueck.de/informatik/shellscript/Html/Man/_Man_NeXT_html/html..., Apr. 21, 1997, 2 pp.

"BizTalk Server 2002 Compiling Maps", http://msdn.microsoft.com/library/en-us/bts_2002/htm/lat_xmltools_map_concept_drgl.a..., Microsoft Corporation, 1999-2001, pp. 1.

"BizTalk Server 2002 Mapper User Interface", http://msdn.microsoft.com/library/en-us/bts_2002/htm/lat_xmltools_map_concept_codw..., Microsoft Corporation, 1999-2001, pp. 1.

"BizTalk Server 2002 Testing Maps", http://msdn.microsoft.com/library/en-us/bts_2002/htm/lat_xmltools_concept_fhhy.a..., Microsoft Corporation, 1999-2001, pp. 1-2.

"BizTalk Server 2002 View Links and Functoids By Using Grid Preview", http://msdn.microsoft.com/library/en-us/bts_2002/htm/lat_xmltools_map_check_fuwn.as..., Microsoft Corporation, 1999-2001, pp. 1.

Bonifati A., "Active Behaviors within XML Document Management", EDBT Ph. D. Workshop, Mar. 2000, pp. 1-4.

Boone, "Concept Features in Re: Agent, An Intelligent Email Agent", Proceedings of the 2nd International Conference on Autonomous Agents, May 9-13, 1998, pp. 141-148.

Bosak, "XML: The Universal Publishing Format", SGML/XML Europe '98, May 1998, pp. A1-C17.

Braganholo, V., "Updating Relational Databases Through XML Views", Technical Report, Sep. 2002, pp. 1-61.

Brockschmidt, K., "Inside OLE, Second Edition", 1995, Microsoft Press, p. 169.

Brooks-Bilson, "Programming ColdFusion" [electronic resource] 2001, Safari Tech Books Online, 1st Edition, 25 pp.

Ceri S. et al., "Deriving Production Rules for Incremental View Maintenance", Proceedings of the 17th International Conference on Very Large Data Bases, Sep. 1991, pp. 577-589.

Claris Em@iler Getting Started User's Guide, For Macintosh, Claris Corporation, 1995-1997, 61 pp.

Clark, James, and DeRose, Steve, "XML Path Language (XPath), Version 1.0", W3C, http://web.archive.org/web/2021010034434/http://www.w3.org/TR/xpath, 1999-2000, pp. 1-31.

Corel, "Corel XMetal 4 and Interwoven TeamXML", http://web.archive.org/web20030807211225/www.corel.com/futuretense_cs/ccurl/corel+xml+4+and+interwoven+teamxml.pdf, Aug. 2003, pp. 1-2.

Corel, "Corel XMetal4, Making XML Content Creation Easy", http://web.archive.org/web/20031118215158/www.corel.com/servlet/Satellite?pagename, Nov. 2003, pp. 1-2.

Corel, "The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.

Cornell, Paul, "Developing Smart Tag DDLs", MSDN Library, http://msdn.microsoft.com/library/default.asp?url=/library/en-us/dnsmarttag/html/odc_smarttags.asp, Apr. 2001, pp. 8.

Desmarais, Michel C. and Jiming Liu; *Exploring the applications user-expertise assessment for intelligent interfaces*; Proceedings of the conference on human factors in computing systems, (1993) p. 308-313.

Devanbue, P. et al., "Chime: customizable hyperlink insertion and maintenance engine for software engineering environments", Software Engineering, Publication date: 1999, ISBN: 1-58113-07400.

Developer's Guide To Apple Data Detectors, For Version 1.0.2., Apple Computer, Inc., 1997, pp. 1-33.

Driza, Scott, "Learn Word 2000 VBA Document Automation", Wordware Publishing Inc., 2001, 6 pp.

Falquet G. et al., "Design and Analysis of Active Hypertext Views on Databases", Information Sciences Institute, Jan. 2002, pp. 1-24.

Fan et al., "FormPlus: A Form Authoring Toolkit", Proceedings of the Fourteenth Annual Computer Software and Applications Conference, Oct. 31, 1990-Nov. 2, 1990, pp. 255-260.

"Featuring Adobe® FrameMaker 6.0", Adobe Systems Incorporated, San Jose, CA, Apr. 2000, 4 pp.

Fernandez M. et al., "SilkRoute: trading between relations and XML", Computer Networks, vol. 33, No. 1-6, Jun. 2000, pp. 723-745.

Flanagan, D., "JavaScript—The Definitive Guide, Fourth Edition", Jan. 2002, O'Reilly, 12 pp.

Foley, James D.; *Future directions in user-computer interface software*; Conference proceedings on organizational computer systems, (1991) p. 289-297.

Foley, Jim; *Integrating computer technology, people technology; strategies and case studies from Georgia Tech's Graphics, Visualization and Usability Center*; Proceedings of the workshop on advanced visual interfaces, (1994) p. 34-43.

Ford, Bryan, Mike Hibler, Jay Lepreau, Roland McGrath and Patrick Tullman; *Interface and execution models in the fluke kernel*; Proceedings of the third symposium on operating systems design and implementation, (1999) p. 101-115.

Getting Results With Microsoft® Office 97, *Real World Solutions For The Work You Do*, Microsoft Corporation, 1995-1997, pp. 1-703.

Glushko, Robert J., Jay M. Tenenbaum and Bart Meltzer; *An XML framework for agent-based E-commerce*; Commun. ACM 42, 3 (Mar. 1999) p. 106.

Goschka, Karl M. and Jurgen Falb; *Dynamic hyperlink generation for navigation in relational databases*; Proceedings of the tenth ACM conference on hypertext and hypermedia: returning to our diverse roots (1999) p. 23-24.

Harold, E.R., "XML: Extensible Markup Language", IDG Books Worldwide, Books 24x7.com printout, 1998, 20 pp.

Hartson, H. Rex and Deborah Hix; *Human-computer interface development: concepts and systems for its management*; ACM Comput. Surv. 1 (Mar. 1989) p. 5-92.

Hewkin, "Smart Tags-the Distributed-Memory Resolution", IEE Review, Jun. 22, 1989, pp. 203-206.

Homer, Alex et al., Professional Active Services Pages, 1997, Wrox Press Ltd., Section "Client-Side Scripting and Components", subsection "Choosing Your Applets, and Controls", 16 pp.

"How to Use XSL to Transform Excel XML Spreadsheet for Server-Side Use", http://support.microsoft.com/default.aspx?scid=kb;en-us; 278976, Microsoft Corporation, Aug. 2004, pp. 1-7.

IBM Corporation, IBM Research Disclosure #368; "Multimedia Hyperlinks Automatically Created For Reference Documents," *IBM Technical Disclosure* Bulletin, Jun. 1993, pp. 1-5.

IBM Technical Disclosure Bulletin, "National Language Support Enhancement for Culture-Specific Operations", Nov. 1, 1993, vol. 36, Issue 11, pp. 629-638.

*InfoCentral™ 7*, User's Manual, Corel Corporation, vol. 1, Version 7.0, 1996, pp. 1-86.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Integrated Development Environment (IDE)", http://web.archive.org/web/20020602032242/http:altova.com/products_ide.html, Jun. 2002, pp. 1-2.

"Integrating with External Systems: iPlanet™ Unified Development Server", Sun Microsystems, Inc., Ver. 5.0, Aug. 2001, pp. 127-156.

"Intelligent Text Processing: About", http://www.syntalex.co.uk/about/about.html, download date: Aug. 7, 1999, 1 pp.

"Intelligent Text Processing: Automatic Cross-Referencing", http://www.syntalex.co.uk/services/acrl.html, download date Aug. 7, 1999, 3 pp.

"Intelligent Text Processing: Case Study: Context", http://www.syntalex.co.uk/casestudies/context.html, download date: Aug. 7, 1999, 3 pp.

Kukich, Karen; *Technique for Automatically Correcting Words in Text*; ACM Comput. Surv., 24, 4 (Dec. 1992); pp. 377-439.

Marais, Hannes, "Supporting Cooperative and Personal Surfing With a Desktop Assistant", 1997, ACM Press, pp. 129-138.

Martensson, Bengt, "Thread-Enhanced Spell Front End for GNU Ernacs+Detex+Delatex", http://www.geocrawler.com/archives/3/337/1987/8/0/1871981/, Aug. 20, 1987, 1 page.

Marx, Matt and Chris Schmandt; *Putting People First: Specifying Proper Names in Speech Interfaces*; Proceedings of the ACM Symposium on User Interface Software and Technology; 1994; pp. 29-37.

Marx, Matthew and Chris Schmandt; *CLUES: dynamic personalized message filtering*; Proceedings of the ACM 1996 conference on computer supported cooperative work (1996) p. 113-121.

McMahon, Lee. E., "SED—A Non-Interactive Text Editor," Bell Laboratories, Murray Hill, New Jersey 07974, Aug. 15, 1978, pp. 16.

Measuring Units Conversion Table—http://web.archie.org- 1997 Internet French Property, pp. 1-4.

Menu Customizing, IBM Technical Disclosure Bulletin, vol. 34, No. 1, Jun. 1991, pp. 91-92 (4 pp. total).

"Microsoft BizTalk Server 2002—Using BizTalk Mapper", http://msdn.Microsoft.com/library/en-us/bts_2002/htm/lat_xmltools_map_intro_zkqb.asp..., Microsoft Corporation, 1999-2001, pp. 1-2.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"Microsoft Unveils Visual Studio.NET Enterprise Tools", Microsoft Corporation, http://microsoft.com/presspass/press/2001/may01/05-21vseepr.mspx, May 2001, pp. 1-4.

Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

Nardi, Bonnie A.; Miller, James R.; Wright, David J., "Collaborative, Programmable Intelligent Agents," Jim Miller/Miramontes Computing, Apple Computer Advanced Technology Group, http://www.miramontes.com/writing/add-cacm/add-cacm/html, Mar. 1998, pp. 1-11.

"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Panagiotis, Christias, Man-cgi 1.15, http://www.calpoly.edu/cgi-bin/man-cgi?spell+1, 1994, 3 pp.

Panagiotis, Christias, Man-cgi 1.15, http://www.physics.umn.edu/cgi-bin/man-cgi?spell, 1994, 5 pp.

Pentland, Alex; *Perceptual user interfaces: perceptual intelligence*; Commun. ACM 43, 3 (Mar. 2000) p. 35-44.

Perry, Brad, et al., "Discovering Similar Resources by Content Park-Linking", Proceedings of the Sixth International Conference on Information and Knowledge Management, published by ACM Press 1997, pp. 317-324.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

Quin, Liam, "Extensible Markup Language (XML)", W3C Architecture Domain, http://web.archive.org/web/2002121962057/http://www.w3.org/XML/, 1996-2002, pp. 1-3.

Santos, C.A.S., L.F.G Soares, G.L. de Souza and J.P. Courtiat; *Design methodology and formal validation of hypermedia documents*; Proceedings of the sixth ACM international conference on multimedia, (1998) p. 39-48.

Schulz, Charles, "Writing Applications for Uniform Operation on a Mainframe or PC: A Metric Conversion Program", Lockheed Missles & Space Company, Inc., Sunnyvale, CA, May 1990, pp. 348-361.

"Smart Tags: Dumb Technology?", webreference.com, Online, Aug. 29, 2001, http://www.webreference.com/xml/column30/3.html, 3 pp.

Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.

Sriram, V., "ComponentXchange: An E-Exchange for Software Components", Master Thesis, CitSeer, May 2001, pp. i-v, 1-77.

Stairmand, Mark A.; *Textual context analysis for information retrieval*; Proceedings of the 20th annual international ACM SIGIR conference on research and development in information retrieval (1997) p. 140-147.

Takkinen et al., "CAFÉ: A Conceptual Model for Managing Information in Electronic Mail", Proceedings of the Annual Hawaii International Conference on System Sciences, 1998, pp. 44-53.

Terveen, Loren, Will Hill and Brian Amento; *Constructing, organizing, and visualizing collections of tropically related Web resources*; ACM Trans. Comput.-um Interact. 6, 1 (Mar. 1999) p. 67-94.

*The Complete LINUX™ Operating System 5.2 Deluxe*, Red Hat, ® Macmillian Digital Publishing USA, A Viacom Company, Red Hat Software, Inc., ISBN 1-57595-199-1B, 1995-1998, pp. 1-385.

"The StarOffice™ 6.0 Suite: New Features Guide", Sun Microsystems, V. 1.1, Jul. 2002, pp. 1-31.

Toth, V., "Visual C++ 4 Unleashed", 1996, Sams Publishing, p. 174.

Towers, J. Tarin, Visual Quickstart Guide: Dreamweaver 2 for Windows and Macintosh, 1999, Peachpit Press, pp. 150-151.

Tsai, M., P. Reiher and G.J. Popek; *Command management system for next-generation user input*; Proceedings of the seventh workshop on hottopics in operating systems, (1999) p. 179-84.

*User Manual For AddressMate and AddressMate Plus*, CoStar Corporation, AddressMate Software, 1994-1995, pp. 1-210.

"Using Flyswat", http://www.flywsat.com/using.html, download date: Sep. 28, 1999, 1 pp.

"What is Flyswat", http://www.flyswat.com, download date: Sep. 28, 1999, 5 pp.

Wilker, John, "ColdFusion MX Adds J2EE, XML, and Web Services Compatibility", Aug. 9, 2002, http://builder.com.com/5102-6387-104585.html, 3 pp.

Willisson, Pace, Ispell (I), "User Commands", http://www.csee.usf.edu/cgi-bin/man-cgi?ispell, 1983, 18 pp.

Willisson, Pace, Ispell (I), http://www.rt.com/man/findaffix.1.html, 1983, 15 pp.

Beitner, N.D.; Hall. W.: Goble, C.A., "Multimedia Support and Authoring in Microcosm: An Extended Model," Technical Report, Dept. of Electronics and Computer Science, Univ. of Southampton, Southampton SO17 1BJ, UK; 1994.

"Chapter 8 - Standard Input and Output," A Course In the UNIX Operating System, by Martin Wayne, copyright 1992-1997, Department of Linguistics and Modern English Language, Lancaster University, Bailrigg, Lancaster LA1 4Y'T (Website: http://www.comp.lancs.ac.uk/computing/users/ciamjw/unix/chap8.html) 3 pp.

Corel[107] Office Professional 7: Quick Results User's Manual, vol. 1, Version 7.0 (first printing), Corel Corporation, 1996, pp. 1-531.

"Handout 38: Spell Checking, Word Counting, and Textual Analysis," http://courses.cs.emporia.edu/pheuttch/courses/2002/cs501sU2/hand38/, 3 pp.: extract from Unix Power Tools, by Shelley Powers et al., Third Ed. printed Oct. 1, 2002 by O'Reilly Media. copyright 2003.

Ispell 4, "Ispell - Format of Ispell Dictionaries and Affix files," http://www.bigbiz.com/egi-bin/manpage?4+ispell, 11 pp., published Oct. 1995.

Kristensen, "Templare Resolution in XML/HTML," Computer Network and ISDN Systems, vol. 30, Sep. 30, 1998 (Special Issue on the 7th Intl. World-Wide Web Conference, Brisbane, Australia, Apr. 1998). pp. 239-249.

Kuenning, Geoff, "International Spell, " http://fmg-www.es.ucla.edu/geoff.ispell,html. 3 pp., published Oct. 11, 1995.

Kuenning, Geoff, "Using ISPELL from Emacs", http://thcochem.ki.ku.dk/on_line_docs/ispell/ispell_1. html. 4 pp-published Jan. 17, 1987.

*Microsoft Computer Dictionary*, Microsoft, Fifth Edition, p. 409, Published: Redmond, Washington by Microsoft Press, copyright 2002.

"Module 123 - Spell," by Felps, Robert, Illustrated UNIX System V/BSD, Publisher: Wordware publishing, Inc., ISBN: 1556221878, printed in Jan. 1992, pp. 501-504, 706 pages (Website: http://duplex.hypermart.net/books/bsd/501-504.html#Heading1).

"Spellout Command," Commands Reference, vol. 5, 1st ed., copyright Oct. 1997 (Website: http://www.iz.uni-hohenheim.de/betriebssysteme/unix/aix/aix_4,3 3_doc/base_doc/usr/ share/man/info/...) 1 page.

* cited by examiner

REPRESENTING LATENT DATA IN AN EXTENSIBLE MARKUP LANGUAGE DOCUMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD OF THE INVENTION

The present invention relates generally to utilization of styles and formatting settings in a computer-generated document. More particularly, the present invention relates to representing latent styles and formatting data in an Extensible Markup Language (XML) document.

BACKGROUND OF THE INVENTION

Computer software applications allow users to create a variety of documents to assist them in work, education, and leisure. For example, popular word processing applications allow users to create letters, articles, books, memoranda, and the like. Spreadsheet applications allow users to store, manipulate, print, and display a variety of alphanumeric data. Such applications have a number of well-known strengths including rich editing, formatting, printing, calculation, and on-line and off-line editing.

A typical software application, such as a word processing application, may have tens or even hundreds of style and formatting properties that may be applied to text and/or data. For example, a word processing application may support many combinations of styles and formatting that may be selected by a user. For example, a style called "Header 1" may be selected by a user for automatically applying a certain font size, display and print justification, tab settings and the like. In addition to numerous settings that may be provided by application developers, many applications also allow a user to develop custom style and formatting settings.

According to prior systems, all of the possible style and formatting settings available to the user, whether used or not, are instantiated when the user saves the document. Unfortunately, when the user opens the document with a newer or different version of the software application that has the same or similar style settings but with different individual properties for the same or similar style settings, the user is stuck with the style or formatting settings instantiated for the document using the previous or creating application. Additionally, the software user may be allowed by his application to dictate that certain styles or formatting settings must be used or that certain styles or formatting settings may not be used with a particular document. In such cases, these styles or formatting settings are likewise instantiated upon document save which prevents the use of future changes to the styles or formatting settings allowed or disallowed by the user. Moreover, instantiation of all styles and formatting settings from a given software application causes the file size of a saved document to be excessive.

It is with respect to these and other considerations that the present invention has been made.

SUMMARY OF THE INVENTION

Embodiments of the present invention solve the above and other problems by allowing styles and other formatting settings to remain latent until one or more particular styles or formatting settings is instantiated by a user. According to aspects of the invention, all available styles and formatting properties are represented as individual latent objects. Data representing each latent style or formatting object is persisted in a data structure apart from the user's document. Each potential style setting or formatting setting may be set as locked for use for a given document or locked for non-use for a given document. Exceptions to locked for use or locked for non-use may be established by the user. Upon saving the document, no data is saved for the numerous available style and formatting settings in the document. Each available document style or formatting setting remains latent and is represented by a persisted data object. When a particular style is then called upon by a subsequent consuming application, that application may then instantiate the particular style or formatting setting based on the properties of that style or formatting setting available from the subsequent consuming application.

These and other features, advantages, and aspects of the present invention may be more clearly understood and appreciated from a review of the following detailed description of the disclosed embodiments and by reference to the appended drawings and claims.

DETAILED DESCRIPTION OF THE PREFERRED EMBODIMENT

Embodiments of the present invention are directed to methods and systems for representing latent style and formatting settings data in an Extensible Markup Language (XML) document. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting senses and the scope of the present invention is defined by the appended claims and their equivalents.

Figure 1:
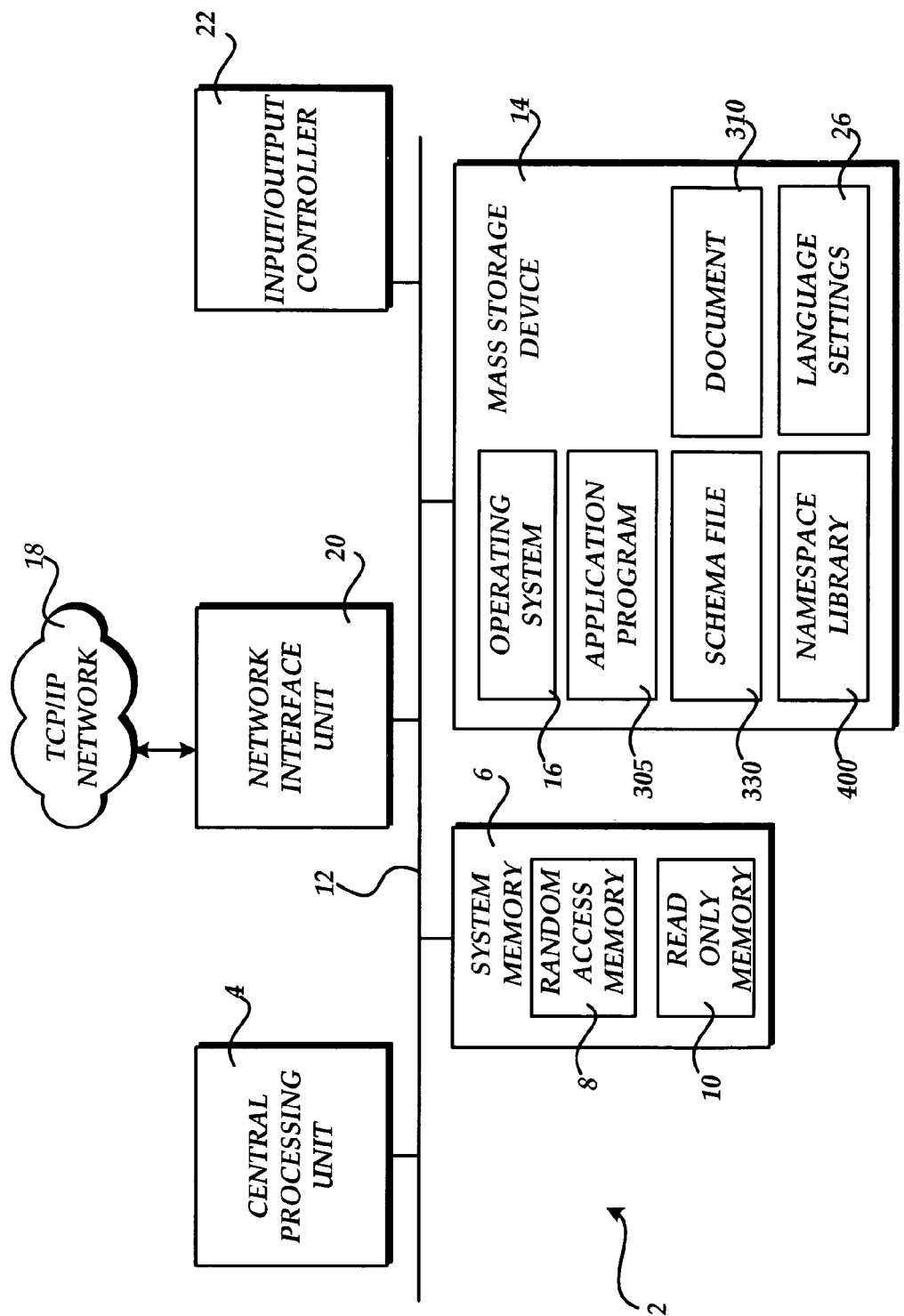
FIG. 1 is a simplified block diagram of a computing system and associated peripherals and network devices that provide an exemplary operating environment for the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 305, a schema file 330, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS XP operating system from MICROSOFT CORPORATION of Redmond, Wash. The mass storage device 14 and RAM 8 may also store one or more application programs. In particular, the mass storage device 14 and RAM 8 may store an application program 305 for creating and editing an electronic document 310. For instance, the application program 305 may comprise a word processing application program, a spreadsheet application, a contact application, and the like. Application programs for creating and editing other types of electronic documents may also be used with the various embodiments of the present invention. The schema file 330, language settings 26, and a namespace/schema library 400, described below, are also shown.

Figure 2:
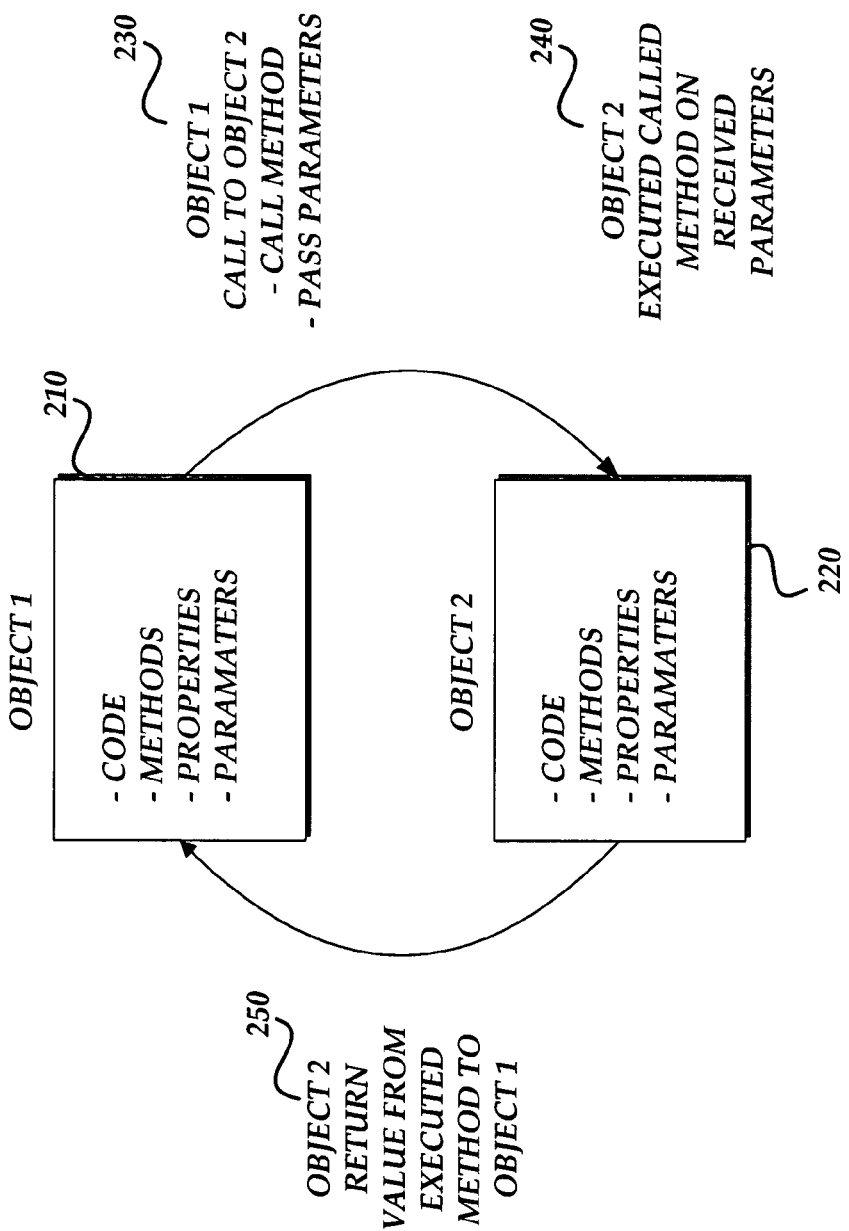
FIG. 2 is a simplified block diagram illustrating interaction between software objects according to an object-oriented programming model.

Exemplary embodiments of the present invention are implemented by communications between different software objects in an object-oriented programming environment. For purposes of the following description of embodiments of the present invention, it is useful to briefly to describe components of an object-oriented programming environment. FIG. 2 is a simplified block diagram illustrating interaction between software objects according to an object-oriented programming model. According to an object-oriented programming environment, a first object 210 may include software code, executable methods, properties, and parameters. Similarly, a second object 220 may also include software code, executable methods, properties, and parameters.

A first object 210 may communicate with a second object 220 to obtain information or functionality from the second object 220 by calling the second object 220 via a message call 230. As is well known to those skilled in the art of object-oriented programming environment, the first object 210 may communicate with the second object 220 via application programming interfaces (API) that allow two disparate software objects 210, 220 to communicate with each other in order to obtain information and functionality from each other. For example, if the first object 210 requires the functionality provided by a method contained in the second object 220, the first object 210 may pass a message call 230 to the second object 220 in which the first object identifies the required method and in which the first object passes any required parameters to the second object required by the second object for operating the identified method. Once the second object 220 receives the call from the first object, the second object executes the called method based on the provided parameters in execution operation 240 and sends a return message 250 containing a value obtained from the executed method back to the first object 210.

For example, in terms of embodiments of the present invention, and as will be described below, a first object 210 may be a third party customized application that passes a message to a second object such as an Extensible Markup Language schema validation object whereby the first object identifies a method requiring the validation of a specified XML element in a document where the specified XML element is a parameter passed by the first object with the identified method. Upon receipt of the call from the first object, according to this example, the schema validation object executes the identified method on the specified XML element and returns a message to the first object in the form of a result or value associated with the validated XML element. Operation of object-oriented programming environments, as briefly described above, are well known to those skilled in the art.

Figure 3:
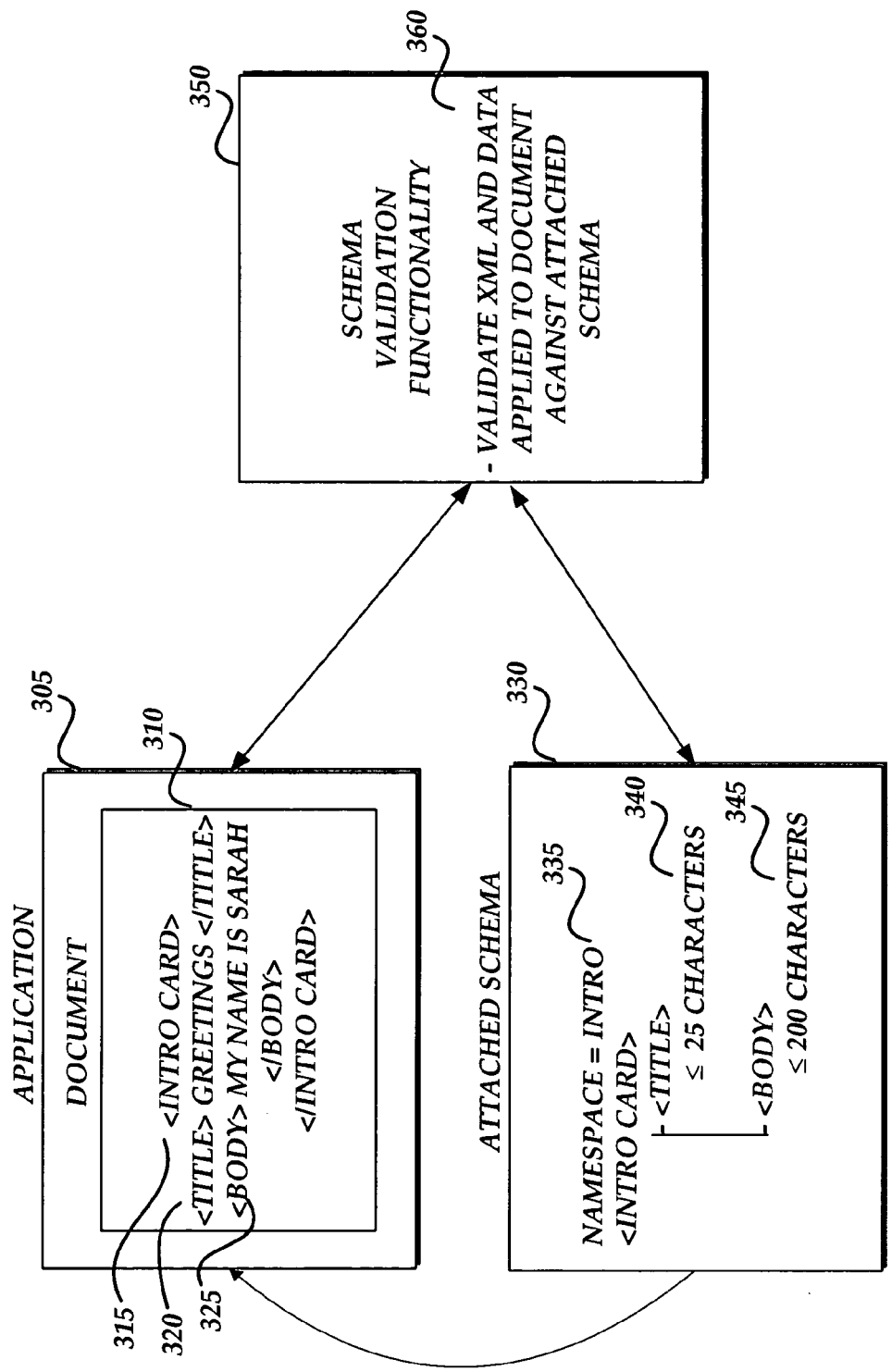
FIG. 3 is a block diagram illustrating interaction between a document, an attached schema file, and a schema validation functionality model.

As described below, embodiments of the present invention are implemented through the interaction of software objects in the use, customization, and application of components of the Extensible Markup Language (XML). FIG. 3 is a block diagram illustrating interaction between a document, an attached schema file, and a schema validation functionality module. As is well known to those skilled in the art, the Extensible Markup Language (XML) provides a method of describing text and data in a document by allowing a user to create tag names that are applied to text or data in a document that in turn define the text or data to which associated tags are applied. For example referring to FIG. 3, the document 310 created with the application 305 contains text that has been marked up with XML tags 315, 320, 325. For example, the text "Greetings" is annotated with the XML tag <title>. The text "My name is Sarah" is annotated with the <body> tag. According to XML, the creator of the <title> and <body> tags is free to create her own tags for describing the tags to which those tags will be applied. Then, so long as any downstream consuming application or computing machine is provided instructions as to the definition of the tags applied to the text, that application or computing machine may utilize the data in accordance with the tags. For example, if a downstream application has been programmed to extract text defined as titles of articles or publications processed by that application, the application may parse the document 310 and extract the text "Greetings," as illustrated in FIG. 3 because that text is annotated with the tag <title>. The creator of the particular XML tag naming for the document 310, illustrated in FIG. 3, provides useful description for text or data contained in the document 310 that may be utilized by third parties so long as those third parties are provided with the definitions associated with tags applied to the text or data.

According to embodiments of the present invention, the text and XML markup entered into the document 310 may be saved according to a variety of different file formats and according to the native programming language of the application 305 with which the document 310 is created. For example, the text and XML markup may be saved according to a word processing application, a spreadsheet application, and the like. Alternatively, the text and XML markup entered into the document 310 may be saved as an XML format whereby the text or data, any applied XML markup, and any formatting such as font, style, paragraph structure, etc. may be saved as an XML representation. Accordingly, downstream or third party applications capable of understanding data saved as XML may open and consume the text or data thus saved as an XML representation. For a detailed discussion of saving text and XML markup and associated formatting and other attributes of a document 310 as XML, see U.S. patent application entitled "Word Processing Document Stored in a Single XML File that may be Manipulated by Applications that Understanding XML," U.S. Ser. No. 10/187,060, filed Jun. 28, 2002, which is incorporated herein by reference as if fully set out herein. An exemplary schema in accordance with the present invention is disclosed beginning on page 11 in an application entitled "Mixed Content Flexibility," Ser. No. 10/726,077, filed Dec. 2, 2003, which is hereby incorporated by reference in its entirety.

In order to provide a definitional framework for XML markup elements (tags) applied to text or data, as illustrated in FIG. 3, XML schema files are created which contain information necessary for allowing users and consumers of marked up and stored data to understand the XML tagging definitions designed by the creator of the document. Each schema file also referred to in the art as a Namespace or XSD file preferably includes a listing of all XML elements (tags) that may be applied to a document according to a given schema file. For example, a schema file 330, illustrated in FIG. 3, may be a schema file containing definitions of certain XML elements that may be applied to a document 310 including attributes of XML elements or limitations and/or rules associated with text or data that may be annotated with XML elements according to the schema file. For example, referring to the schema file 330 illustrated in FIG. 3, the schema file is identified by a Namespace "intro" 335 the schema file includes a root element of <intro card>.

According to the schema file 330, the <intro card> element serves as a root element for the schema file and also as a parent element to two child elements <title> and <body>. As is well known to those skilled in the art, a number of parent elements may be defined under a single root element, and a number of child elements may be defined under each parent element. Typically, however, a given schema file 330 contains only one root element. Referring still to FIG. 3, the schema file 330 also contains attributes 340 and 345 to the <title> and <body> elements, respectfully. The attributes 340 and 345 may provide further definition or rules associated with applying the respective elements to text or data in the document 310. For example, the attribute 345 defines that text annotated with the <title> element must be less than or equal to twenty-five characters in length. Accordingly, if text exceeding twenty-five characters in length is annotated with the <title> element or tag, the attempted annotation of that text will be invalid according to the definitions contained in the schema file 330.

By applying such definitions or rules as attributes to XML elements, the creator of the schema may dictate the structure of data contained in a document associated with a given schema file. For example, if the creator of a schema file 330 for defining XML markup applied to a resume document desires that the experience section of the resume document contain no more than four present or previous job entries, the creator of the schema file 330 may define an attribute of an <experience> element, for example, to allow that no more than four present or past job entries may be entered between the <experience> tags in order for the experience text to be valid according to the schema file 330. As is well known to those skilled in the art, the schema file 330 may be attached to or otherwise associated with a given document 310 for application of allowable XML markup defined in the attached schema file to the document 310. According to one embodiment, the document 310 marked up with XML elements of the attached or associated schema file 330 may point to the attached or associated schema file by pointing to a uniform resource identifier (URI) associated with a Namespace identifying the attached or associated schema file 330.

According to embodiments of the present invention, a document 310 may have a plurality of attached schema files. That is, a creator of the document 310 may associate or attach more than one schema file 330 to the document 310 in order to provide a framework for the annotation of XML markup from more than one schema file. For example, a document 310 may contain text or data associated with financial data. A creator of the document 310 may wish to associate XML schema files 330 containing XML markup and definitions associated with multiple financial institutions. Accordingly, the creator of the document 310 may associate an XML schema file 330 from one or more financial institutions with the document 310. Likewise, a given XML schema file 330 may be associated with a particular document structure such as a template for placing financial data into a desirable format.

According to embodiments of the present invention, a collection of XML schema files and associated document solutions may be maintained in a Namespace or schema library located separately from the document 310. The document 310 may in turn contain pointers to URIs in the Namespace or schema library associated with the one or more schema files attached to otherwise associated with the document 310. As the document 310 requires information from one or more associated schema files, the document 310 points to the Namespace or schema library to obtain the required schema definitions. For a detailed description of the use of an operation of Namespace or schema libraries, see U.S. patent application entitled "System and Method for Providing Namespace Related Information," U.S. Ser. No. 10/184,190, filed Jun. 27, 2002, and U.S. patent application entitled "System and Method for Obtaining and Using Namespace Related Information for Opening XML Documents," U.S. Ser. No. 10/185,940, filed Jun. 27, 2002, both U.S. patent applications of which are incorporated herein by reference as if fully set out herein. For a detailed description of a mechanism for downloading software components such as XML schema files and associated solutions from a Namespace or schema library, see U.S. patent application entitled Mechanism for Downloading Software Components from a Remote Source for Use by a Local Software Application, U.S. Ser. No. 10/164,260, filed Jun. 5, 2002.

Referring still to FIG. 3, a schema validation functionality module 350 having validation instructions 360 is illustrated for validating XML markup applied to a document 310 against an XML schema file 330 attached to or otherwise associated with the document 310, as described above. As described above, the schema file 330 sets out acceptable XML elements and associated attributes and defines rules for the valid annotation of the document 310 with XML markup from an associated schema file 330. For example, as shown in the schema file 330, two child elements <title> and <body> are defined under the root or parent element <intro card>. Attributes 340, 345 defining the acceptable string length of text associated with the child elements <title> and <body> are also illustrated. As described above, if a user attempts to annotate the document 310 with XML markup from a schema file 330 attached to or associated with the document in violation of the XML markup definitions contained in the schema file 330, an invalidity or error state will be presented. For example, if the user attempts to enter a title string exceeding twenty-five characters, that text entry will violate the maximum character length attribute of the <title> element of the schema file 330. In order to validate XML markup applied to a document 310, against an associated schema file 330, a schema validation module 350 is utilized. As should be understood by those skilled in the art, the schema validation module 350 is a software module including computer executable instructions sufficient for comparing XML markup and associated text entered in to a document 310 against an associated or attached XML schema file 330 as the XML markup and associated text is entered in to the document 310.

According to embodiments of the present invention, the schema validation module 350 compares each XML markup element and associated text or data applied to the document 310 against the attached or associated schema file 330 to determine whether each element and associated text or data complies with the rules and definitions set out by the attached schema file 330. For example, if a user attempts to enter a character string exceeding twenty-five characters annotated by the <title> elements 320, the schema validation module will compare that text string against the text string attribute 340 of the attached schema file 330 and determine that the text string entered by the user exceeds the maximum allowable text string length. Accordingly, an error message or dialogue will be presented to the user to alert the user that the text string being entered by the user exceeds the maximum allowable character length according to the attached schema file 330. Likewise, if the user attempts to add an XML markup element between the <title> and the <body> elements, the schema validation module 350 will determine that the XML markup element applied by the user is not a valid element allowed between the <title> and <body> elements according to the attached schema file 330. Accordingly, the schema validation module 350 will generate an error message or dialogue to the user to alert the user of the invalid XML markup.

Representing Latent Data in an Extensible Markup Language Document

As briefly described above, embodiments of the present invention allow style and other formatting settings to remain as latent data objects available for use with a computer-generated document across varying versions of a software application. Style and formatting properties available for use with a computer-generated document are represented in an Extensible Markup Language document as latent objects and are maintained in a separate data array so that each of the different styles and formatting properties are not instantiated upon document saving. Because the various style and formatting properties remain latent as represented in a separate data array, a future consuming application may instantiate only those style and formatting settings as required for a given document.

Figure 4:
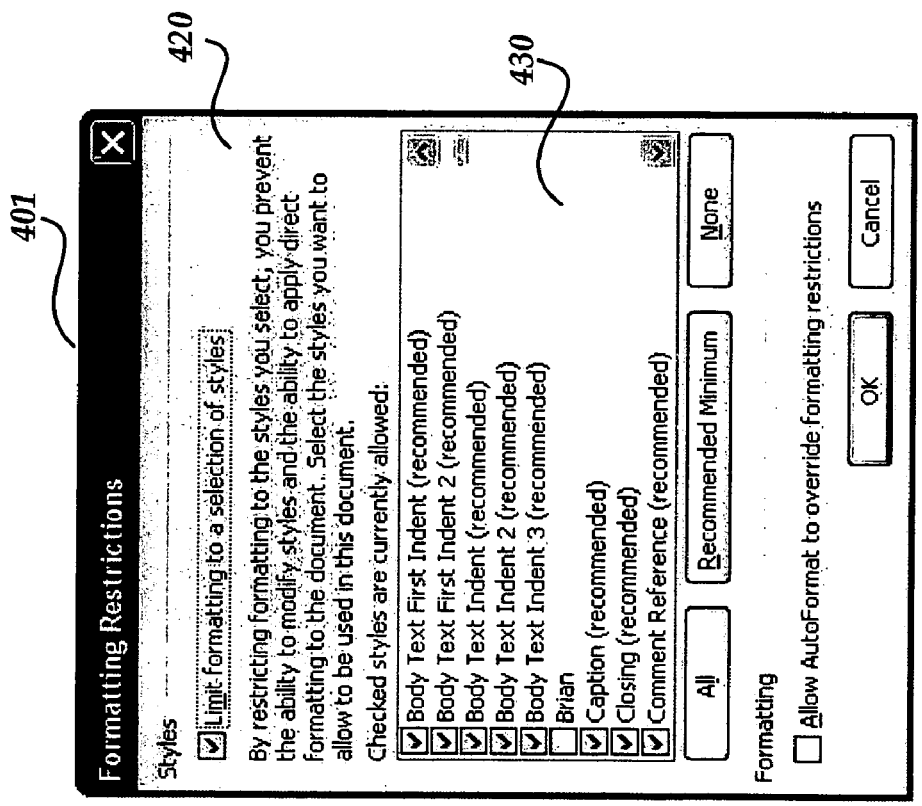
FIG. 4 illustrates a computer-generated screen shot for allowing a user to selectively lock or unlock available style settings for application to a document.

FIG. 4 illustrates a computer-generated screen shot 401 for allowing a user to selectively lock or unlock available style settings for application to a document. As is appreciated by those skilled in the art, a typical software application, such as a word processing application, may have tens or even hundreds of different style and formatting settings available for application to text and data. A typical style setting might include a style setting called "header 1" in which a particular print size, font, paragraph structure and the like are established. Selection of this style and application to a portion of text or to an entire document will apply the properties of the style setting to the selected text or document. Because each style setting may include numerous properties and because a given software application may include tens or even hundreds of style settings, if each style setting is fully instantiated at the time of document save, file sizes become enormous. Moreover, instantiation of all available style settings may prevent the user of a future or varying version of the software application from utilizing different style settings other than those instantiated by the user upon document save.

Referring to FIG. 4, an exemplary user interface 420 for allowing a user to select style settings 430 that may be used with a particular document or text selection or for allowing the user to select style settings that may not be used for a document or given text selection is described. According to embodiments of the present invention, whether formatting styles are marked as locked for use or locked for non-use, those style settings are not instantiated upon document save, but data representing which style settings are locked and which style settings are unlocked is maintained in a separate data array for future reference by a future application program opening a given document. For a detailed description of locking and unlocking styles and formatting changes for use in association with a computer-generated document, see U.S. patent application Ser. No. 10/664,734, filed Sep. 18, 2003, entitled "Method and Apparatus For Restricting The Application Of Formatting To The Contents Of An Electronic Document," applicant matter number 60001.0274US01/304205.1, which is expressly incorporated herein by reference as if fully set out herein.

Figure 5:
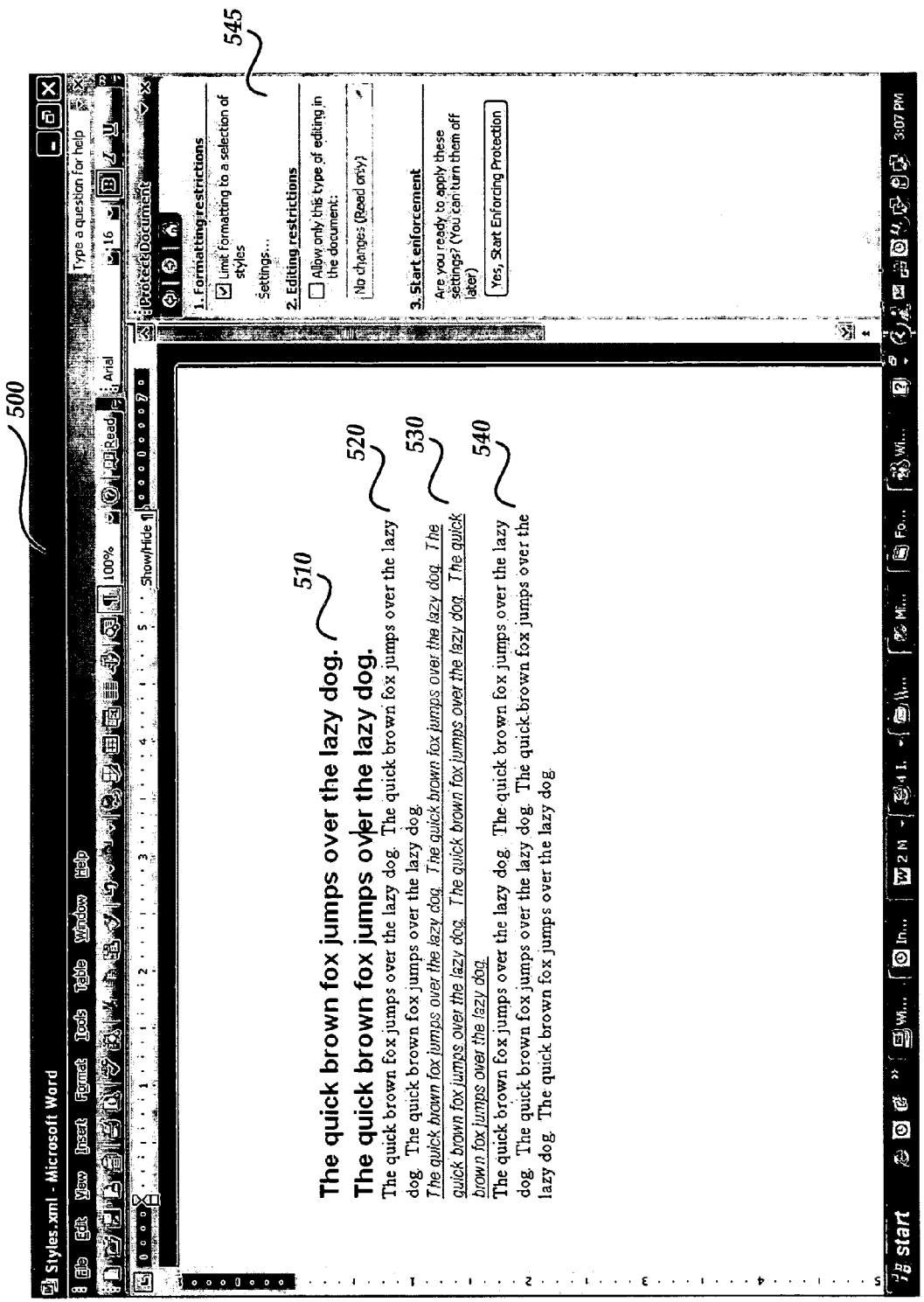
FIG. 5 illustrates a computer-generated screen shot showing a document formatted according to a number of different style settings.

FIG. 5 illustrates a computer-generated screen shot 500 showing a document formatted according to formatting restrictions 545 and a number of different style settings. As shown in FIG. 5, a document is illustrated whereby four separate style settings 510, 520, 530, and 540 have been applied to text selections in the document.

Figure 6:
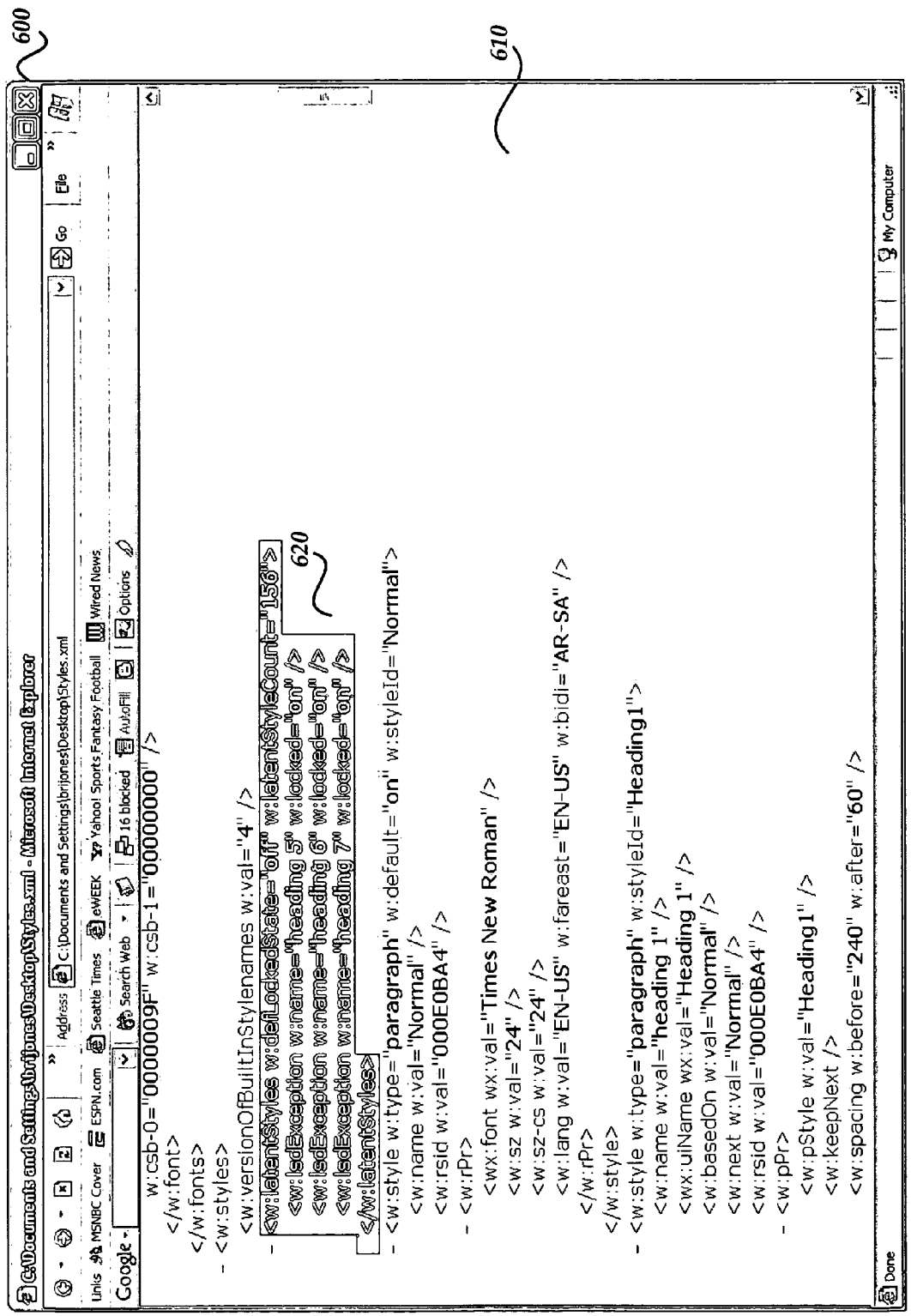
FIG. 6 illustrates a computer-generated screen shot showing a sample XML file according to embodiments of the present invention.

FIG. 6 illustrates a computer-generated screen shot 600 showing a sample XML file according to embodiments of the present invention. According to embodiments of the present invention, all style settings available for use with a given document are enumerated and data representing each style setting is saved as a latent data object in a separate data array apart from the document. For example, if 156 different style and/or formatting settings are available to the document according to the application program creating the document, a latent count of 156 is set. After the total number of latent style or formatting settings is enumerated, a default state of locked for use or locked for non-use is set for the entire set of enumerated latent style and formatting objects. Any exceptions to the default state are then made. For example, if the user defines that only styles "heading 5, heading 6 and heading 7" may be used for a given document, then all available style and formatting settings will be set to a default of locked for non-use and the style settings "heading 5, heading 6 and heading 7" will be set as exceptions to the default state. According to one embodiment of the invention, the default state may be applied to all style and formatting settings comprising a majority of the enumerated style and formatting settings while the remaining settings will be set as exceptions. That is, if 100 file and formatting settings are available and 60 formatting settings are locked for non-use, then the default state will be set as locked for non-use and the remaining 40 style settings will be designated as exceptions to the default state.

Referring to FIG. 6, an XML representation of a word processing document 610 is illustrated. For representing the latent style and formatting objects saved to a separate data array for referenced by the document 610, an XML tag of <w:latentStyles> is utilized. Within the latent style tag, a default state property is set to "on or off" and a latent style count is enumerated. From the example shown in FIG. 6, a latent style count of 156 indicates that 156 different style or formatting settings are available and that the default state for the 156 style settings is "off" meaning that the default state for each of the 156 possible style and formatting settings is that they may be used with the document 610. Following with the example illustrated in FIG. 6, the user has set styles "heading 5, heading 6 and heading 7" 620 as locked for non-use with the document. Accordingly, by saving the XML structure as illustrated in FIG. 6, a subsequent consuming application that is capable of parsing the XML structure will understand that of the 156 potential style and formatting settings for use with the document, styles "heading 5, heading 6 and heading 7" 620 are exceptions to the default state and may not be used with the document. Advantageously, no XML representation must be made of each and every potential style or formatting setting or of the locked or unlocked state for each and every style or formatting setting which would increase file size and processing time dramatically. Thus, the subsequent XML parsing application needs only to reference the separate data array in which is maintained data representative of each of the potential style and formatting settings.

For example, if a user prepares a document in the United States using a U.S./English language-based XML schema file, and the user designates the latent style locked or unlocked states and exceptions as illustrated in FIG. 6, then the user may send the document to a colleague operating her computer in the Far East using a multilingual or Far East language XML schema file and XML parsing applications for parsing the document provided by the user. The colleague utilizing the document according to Far East language settings will be prevented from using style settings "heading 5, heading 6 and heading 7" because the first user locked those style settings from use, but the colleague in the Far East will be able to utilize other style settings and will be able to use Far East particular fonts and other formatting properties assigned to the usable style settings using the multilingual or Far East XML schema file associated with the colleague's application program because the set of potential style or formatting settings have not been previously instantiated according to the first user's XML schema file. That is, if the colleague in the Far East wishes to use a style setting such as "heading 8" which has not been designated as an exception to the style lock state by the user, the colleague in the Far East may select style "heading 8" and style "heading 8" will be applied to the document according to the font and property characteristics available for that style based on the colleague's application program version or language settings. On the other hand, without the functionality of the present invention, all style settings whether locked or unlocked for use would be instantiated upon document save by the first user and would be saved out as part of the document save. Accordingly, the user's colleague in the Far East would not be able to apply Far East font properties available via the colleague's version of the application program because the properties for each of the potential style and formatting settings will already be populated in the manner in which they were instantiated by the first user who created the document.

As described herein, methods and systems are provided for allowing Extensible Markup Language representation of latent styles and formatting data in an XML document. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of representing formatting functionality available to an application program for applying to a document, comprising:

saving a document as an Extensible Markup Language (XML) representation whereby XML markup is applied to the document to represent text and data objects, properties and attributes including formatting styles applied to the document;

enumerating all formatting styles available to the document according to functionality of an application program creating or editing the document;

setting a default designation for the enumerated formatting styles as locked for use or locked for non-use;

for any of the enumerated formatting styles that may be used or that may not be used in contradiction to the default designation for all enumerated formatting styles, designating said any of the enumerated formatting styles as an exception to the default designation; and saving data identifying the enumerated formatting styles, identifying the default designation, and identifying any exceptions to the default designation to a data structure separate from the document;

wherein when the default designation is set as locked for non-use, the any exceptions comprise a minority of the enumerated formatting styles and are available for use; and wherein when the default designation is set as locked for use, the any exceptions comprise a minority of the enumerated formatting styles and are not available for use.

2. The method of claim 1, further comprising applying an XML markup to the document representing a count of the enumerated formatting styles, representing the default designation for the enumerated formatting styles, and representing formatting styles that are designated as exceptions to the default designation.

3. The method of claim 2, further comprising applying an XML markup to the document representing a pointer to the data structure.

4. The method of claim 3, further comprising:

opening the document by a subsequent consuming application;

parsing the document for XML markup representing a count of the enumerated formatting styles, representing the default designation for the enumerated formatting styles, and representing formatting styles that are designated as exceptions to the default designation; and parsing the document for a pointer to the data structure for determining formatting styles enumerated for the document.

5. The method of claim 4, further comprising determining the default designation for the enumerated formatting styles.

6. The method of claim 5, further comprising determining whether any exceptions to the default designation are designated for the document.

7. The method of claim 6, whereby if a desired formatting style is available for use, instantiating the formatting style by the consuming application according to formatting functionality available to the consuming application associated with the desired formatting style.

8. The method of claim 7, further comprising formatting the document with the instantiated formatting style.

9. A computer program product comprising a computer-readable medium having control logic stored therein for causing a computer to represent formatting functionality available to an application program for applying to a document, the control logic comprising computer-readable program code for causing the computer to:

save a document as an Extensible Markup Language (XML) representation whereby XML markup is applied to the document to represent text and data objects, properties and attributes including formatting styles applied to the document;

enumerate all formatting styles available to the document according to functionality of an application program creating or editing the document;

setting a default designation for the enumerated formatting styles as locked for use or locked for non-use;

for any of the enumerated formatting styles that may be used or that may not be used in contradiction to the default designation for all enumerated formatting styles, designate said any of the enumerated formatting styles as an exception to the default designation; and save data identifying the enumerated formatting styles, identifying the default designation, and identifying any exceptions to the default designation to a data structure separate from the document;

wherein when the default designation is set as locked for non-use, the any exceptions comprise a minority of the enumerated formatting styles and are available for use; and wherein when the default designation is set as locked for use, the any exceptions comprise a minority of the enumerated formatting styles and are not available for use.

10. The computer program product of claim 9, further comprising computer-readable program code for causing the computer to apply an XML markup to the document representing a count of the enumerated formatting styles, represent the default designation for the enumerated formatting styles, and represent formatting styles that are designated as exceptions to the default designation.

11. The computer program product of claim 10, further comprising computer-readable program code for causing the computer to apply an XML markup to the document representing a pointer to the data structure.

12. The computer program product of claim 11, further comprising computer-readable program code for causing the computer to:

open the document by a subsequent consuming application;

parse the document for XML markup representing a count of the enumerated formatting styles, represent the default designation for the enumerated formatting styles, and represent formatting styles that are designated as exceptions to the default designation; and parse the document for a pointer to the data structure for determining formatting styles enumerated for the document.

13. The computer program product of claim 12, further comprising computer-readable program code for causing the computer to determine the default designation for the enumerated formatting styles.

14. The computer program product of claim 13, further comprising computer-readable program code for causing the computer to determine whether any exceptions to the default designation are designated for the document.

15. The computer program product of claim 14, further comprising computer-readable program code for causing the computer to instantiate a desired formatting style by the consuming application according to formatting functionality available to the consuming application associated with the desired formatting style when the desired formatting style is available for use.

16. The computer program product of claim 15, further comprising computer-readable program code for causing the computer to format the document with the instantiated formatting style.

* * * * *